Patented July 1, 1941

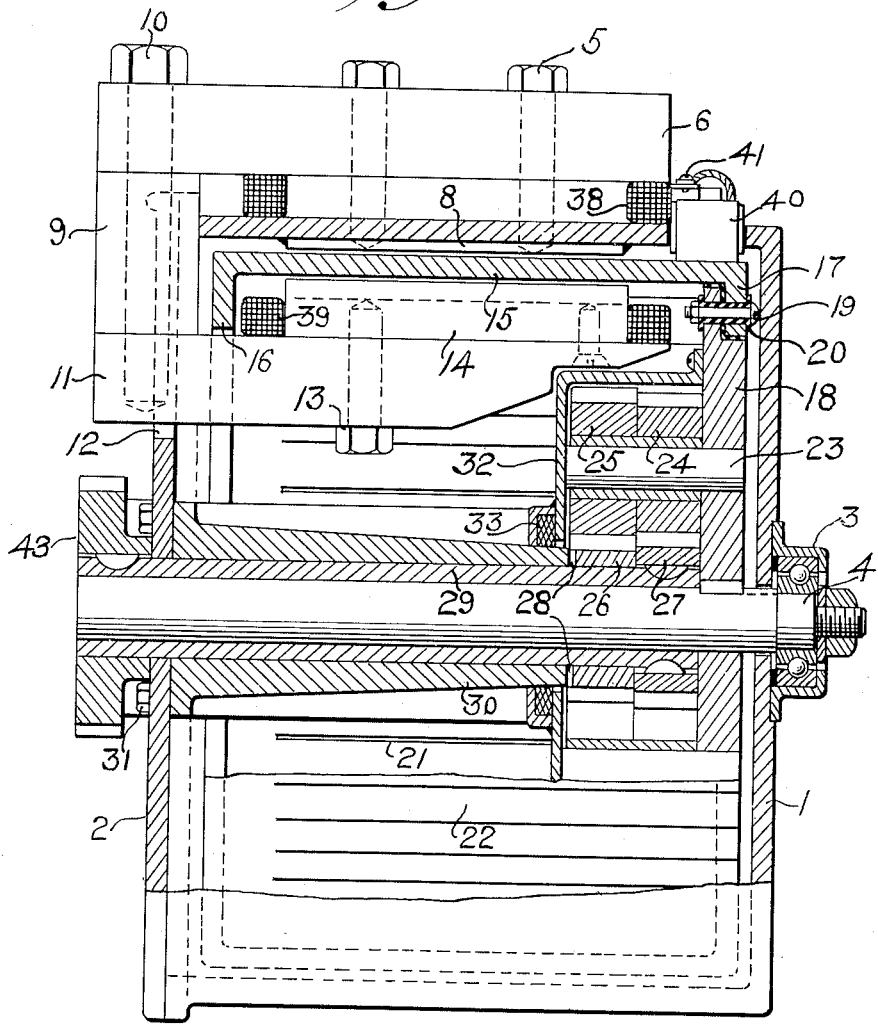

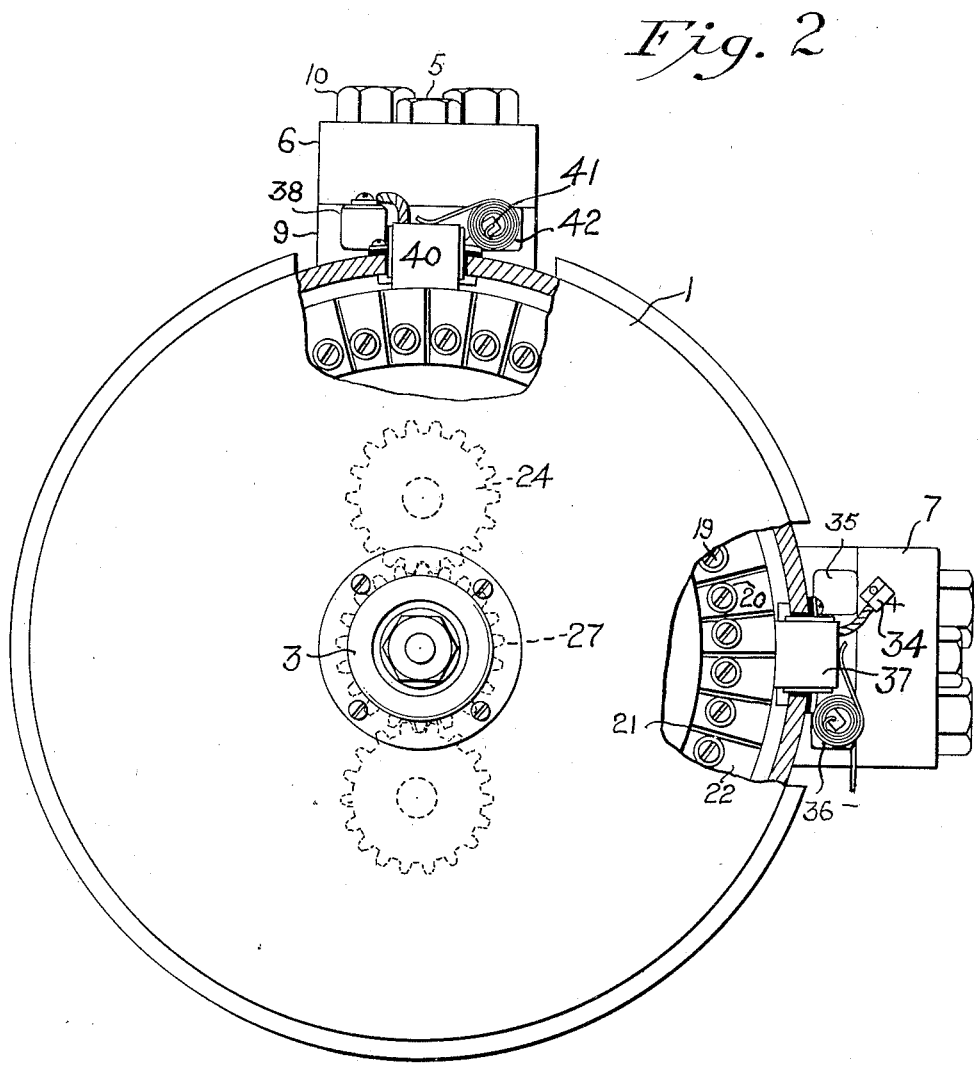

2,247,645

UNITED STATES PATENT OFFICE 2,247,645

ELECTRIC STARTING MOTOR

Joseph W. Suydam, Bayport, N. Y.

Application May 13, 1940, Serial No. 334,883

5 Claims. (Cl. 172—36)

This invention relates to improvements in starting motors powered by electricity and employed in connection with internal combustion engines.

The objects of the invention are to provide means for connecting the starting motor to the end of an engine driving shaft by using a planetary reduction gearing system contained entirely in the starting motor housing and arranged in a casing whereby the gearing is packed in grease, and further to provide in combination with other parts of special construction and arrangement, an armature which does not require to be fitted with any windings or coils of any description, and which does not need a commutator.

In the accompanying drawings the special construction and arrangement of the elements of this invention are illustrated, and Fig. 1 represents a starting motor with part of the housing and armature broken away to expose interior members shown in section.

Fig. 2 is an end view of this starting motor, with portions of the housing broken away and partly in section to disclose the internal structure and arrangement.

Throughout the description and drawings the same number is used to refer to the same part.

Considering the drawings, a housing 1 of any chosen form, usually cylindrical, and which may be provided with any selected means of support, has one closed end and the opposite or open end covered by a closing wall or plate 2. On the exterior of the closed end of the housing is located a bearing 3, in which is borne the end of the axial shaft 4.

By means of bolts such as bolt 5, Fig. 1, there are attached exteriorly to the housing the portions 6 and 7 of the field magnets, and in Fig. 1 it is shown that the magnetic coupling piece 9 by means of bolt 10 is secured to the magnetic piece 11 which passes into the housing through opening 12 therein. A bolt 13 passes through the piece 11 securing thereto the field pole 14 presented to the inside of the hollow, cylindrical metal armature 15. At one end the armature has formed the integral annular stiffening flange 16, and a like flange 17 also is made at the other end. A disk 18 closes the open end of the armature and is secured upon flange 17 by screws 19 surrounded by insulation 20. Disk 18 is thus insulated. The armature 18 and its end flange 17 are constructed with spaced slots 21, usually one-half inch apart and extending for a part of the length of the armature substantially as shown, forming conducting bars 22.

As illustrated in Fig. 1 the disk has an inwardly projecting gear shaft 23 on which rotate the gears 24 and 25. These gears are intended to be keyed or connected together so that they will revolve as a unit about the shaft 23. Gears 24 and 25 are in mesh with gears 26 and 27 supported by the hollow shaft 29 movably fitting the axial shaft 4. In Fig. 1 will also be noted the bearing sleeve 30 movably fitting the hollow shaft and having one end attached by bolts 31 to the end plate 2 of the housing. Gear 26 is intended to be attached to the sleeve 30 which is provided with two integral tongues 28. These two tongues enter slots in the adjacent side of the gear 26 making the gear stationary with the sleeve. The gear 27 is attached to the hollow shaft 29 and with the other gears constitutes a speed reduction system for shaft 29. Inside the disk 18 is placed a casing 32 having a packing 33 in contact with sleeve 30. The casing encloses the gears in grease to avoid friction.

In Fig. 2 will be noted one of the terminals 34 of the field coil 35 and spring contact 36 on brush 37, and in Fig. 1 is shown the field coil 38 located upon the outside of the housing 1, and it will be also further observed that the coil 38 encircles the pole piece 8 which passes from the outside through the housing and is presented to the outside surface and bars of the armature. The field coil 39 surrounds the pole piece 14 on the inside of the armature and presented to the inner surfaces of the bars 22. The brush 40 by way of terminal 41 and the spring contact 42 connects with the field coils. In Fig. 1 is illustrated a ratchet wheel 43, or equivalent means for connecting the hollow shaft 29 with the engine shaft of an internal combustion motor.

From Fig. 1 it will be understood that the tongues 28 mentioned herein hold gear 26 stationary with and at the end of fixed bearing sleeve 30, gear 26 being supported upon the hollow shaft 29. Gear 26 is in mesh with gear 25, and when the armature 15 is revolved by the energized field magnets gears 25 and 24 are rotatively driven at the same time being connected together. As gear 24 engages gear 27 keyed on the motor sleeve shaft 29, the starter gear 43 keyed on the end of the shaft is driven with the shaft.

In the operation, the current from the battery reaches the armature bars through one of the brushes, and flows along the contacted bar to the unslotted portion of the armature, from which it flows to armature bars at a different point around the cylindrical armature, thence through the field coils back to the battery. There is no armature or windings thereon. The entire mechanism and magnetic features are contained on and within the one housing as illustrated.

Having now described this invention, I claim:

1. In an electric motor, an armature comprising a unitary hollow metal cylinder, a shaft revoluble axially with the said armature, an insulated disk secured to the open end of the said armature cylinder, a system of gearing connecting the said disk and shaft whereby the shaft is driven, the said armature being constructed with a series of slots extending lengthwise for a part of the length of said cylinder forming conducting bars, said disk being secured to the ends of said bars, field magnets having field coils with terminals adapted to be connected with a current source, field poles presented to the said bars, and brushes bearing on the said bars at different points around the slotted armature.

2. In an electric motor, a housing, an armature comprising a hollow metal cylinder, an axial shaft provided with a bearing carried by the housing, a hollow shaft carried by the axial shaft and having a bearing formed in said housing, an insulated disk, said armature being constructed with a series of slots extending lengthwise for a part of the length of said armature forming conducting bars, said disk being secured to the ends of said bars, field magnets having field coils provided with terminals adapted to be connected with a current source, field poles presented to said bars, a series of speed reduction gears borne by said disk and acting upon said hollow shaft, means for connecting the hollow shaft with an engine driving shaft, and brushes in circuit with the said field coils and bearing upon the said bars at different points around the slotted armature.

3. In an electric motor, a housing, an armature comprising a unitary hollow metal cylinder, an axial shaft having a bearing carried by the housing, a hollow shaft carried by the axial shaft and having a bearing formed in said housing, an insulated disk, said armature being constructed with a series of slots extending lengthwise for a part of the length of said armature forming conducting bars, said disk being secured to the ends of said bars, field magnets having field coils provided with terminals adapted to be connected with a current source, field poles extended to be presented to said bars on the inside and on the outside of said armature, a series of speed reduction gears borne by said disk and arranged to act upon said hollow shaft, means whereby the hollow shaft may be connected with an engine driving shaft, and brushes bearing on said bars at different points around the slotted armature.

4. In an electric motor, a housing, an armature comprising a hollow metal cylinder, an axial shaft provided with a bearing carried by the housing, a hollow shaft carried by the axial shaft and having a bearing formed in said housing, an insulated disk, said armature being constructed with a series of slots extending lengthwise for a part of the length of said armature forming conducting bars, said disk being secured to the ends of said bars, field magnets having field coils provided with terminals adapted to be connected with a current source, field poles presented to said bars, a series of speed reduction gears borne by said disk and acting upon said hollow shaft, a casing carried by said disk interiorly and enclosing said gears whereby the gears may be packed in grease, means for connecting the hollow shaft with an engine driving shaft, and brushes in circuit with said field coils and bearing upon said bars at different points around the slotted armature.

5. In an electric motor, an armature comprising a hollow cylinder of metal, a shaft located axially within the armature, means insulated with respect to the armature and connected with the shaft, said armature being constructed with a series of slots extending lengthwise to one end of the armature and for a part of the length thereof forming separated conducting bars, field magnets having coils with terminals adapted to be connected with a source of electric current, field magnet poles presented to said bars, and brushes in circuit with the field coils and arranged to bear upon said bars at different points around the slotted armature.

JOSEPH W. SUYDAM.